United States Patent
Foo et al.

(10) Patent No.: US 7,930,734 B2
(45) Date of Patent: Apr. 19, 2011

(54) METHOD AND SYSTEM FOR CREATING AND TRACKING NETWORK SESSIONS

(75) Inventors: Ian Foo, Raleigh, NC (US); Jeremy Stieglitz, Menlo Park, CA (US); Arthur Zavalkovsky, Netanya (IL); Jeevan S. Patil, San Jose, CA (US); Partha Bhattacharya, Cupertino, CA (US); Jason Frazier, Raleigh, NC (US); Ellis Roland Dobbins, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1092 days.

(21) Appl. No.: 11/414,540

(22) Filed: Apr. 28, 2006

(65) Prior Publication Data

US 2007/0256122 A1 Nov. 1, 2007

(51) Int. Cl.
*H04L 9/32* (2006.01)
*G06K 9/00* (2006.01)

(52) U.S. Cl. ........ 726/5; 726/6; 726/7; 726/19; 709/228
(58) Field of Classification Search ............ 726/22
See application file for complete search history.

(56) References Cited

U.S. PATENT DOCUMENTS 6,691,232 B1 * 2/2004 Wood et al. ............... 726/6
7,293,096 B1 * 11/2007 Foltak et al. ............. 709/228
2002/0176377 A1 * 11/2002 Hamilton ................ 370/328
2006/0268741 A1 * 11/2006 Batta et al. ............. 370/254
2007/0220596 A1 * 9/2007 Keeler et al. .............. 726/7

OTHER PUBLICATIONS

IEEE, "8021.1X—IEEE Standard for Local and Metropolitan Area Networks—Port based Network Access Control," IEEE computer Society LAN/MAN Standards Committee, Dec. 13, 2004, pp. iii-vii, 1-169 (179 total).
Rigney, C et al., "Radius Accounting," Network Working Group, RFC 2866, Jun. 2000, pp. 1-28.
Rigney, C et al., "Remote Authentication Dial In User Service (Radius)," Network Working Group, RFC 2865, Jun. 2000, pp. 1-68.

* cited by examiner

*Primary Examiner* — Nasser Moazzami
*Assistant Examiner* — Fikremariam Yalew
(74) *Attorney, Agent, or Firm* — Hickman Palermo Truong & Bekcer LLP (57) ABSTRACT

A method and system is disclosed for creating and tracking network sessions. A request to access a network is received from an entity. The entity is authenticated after the request is received. Authenticated identity information associated with the entity, network address information associated with the entity, and network location information associated with the entity is collected. An information set is created. The information set comprises and binds together the authenticated identity information, the network address information, and the network location information. The information set indicates a present association among the authenticated identity information, the network address information, and the network location information. The information set is stored in a session record in a centralized database. The session record represents a session in which the entity accesses the network. The session record is one of a plurality of session records that are stored in the centralized database. The plurality of session records is used by a data processing system to perform real-time diagnostics of the network.

23 Claims, 4 Drawing Sheets

112 Centralized Database

| Authenticated ID | Client IP Address | Client MAC Address | Edge Device IP Address | Edge Device Port ID | RADIUS Session ID | |
|---|---|---|---|---|---|---|
| 2025551212 | 10.1.16.124 | 00-40-CA-13-AE-BF | 10.1.16.52 | 4/1 | 00005027 | ... |
| 7530200520 | 10.1.16.126 | 00-30-94-C2-C3-C1 | 10.1.16.28 | 7/3 | 00600106 | ... |
| ... | ... | | | | | ... |

Fig. 4

METHOD AND SYSTEM FOR CREATING AND TRACKING NETWORK SESSIONS

FIELD OF THE INVENTION

The present invention generally relates to network management. The invention relates more specifically to a method and system for creating and tracking network sessions.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network traffic streams in a Local Area Network (LAN) environment are typically identifiable by their associated network addresses, such as, for example, Internet Protocol (IP) addresses. In addition, some LAN environments provide mechanisms for authenticating client devices that originate such network traffic streams and/or users that may be accessing the LAN through the client devices.

For example, a LAN environment may be configured to operate over one or more protocols that conform to the Institute for Electrical and Electronics Engineers (IEEE) Standard 802.1X for port-based network access control. The latest version of the IEEE 802.1X standard, IEEE 802.1X™-2004, was published by the IEEE on 13 Dec. 2004, and its entire contents are hereby incorporated by reference for all purposes as if fully set forth herein. The IEEE 802.1X is an authentication specification for allowing a client device to connect to a wireless access point or to a wired edge device in a LAN, but preventing the client device from gaining access to the LAN resources until the client device and/or its user(s) provide credentials that are verified by a separate authentication server. The IEEE 802.1X specification supports a wide variety of authentication mechanisms for verifying client and/or user-supplied credentials, such as, for example, token cards, Kerberos, one-time passwords, certificates, and public key encryption. In addition, the port-based access control mechanisms provided in the IEEE 802.1X specification make use of the physical access characteristics of the LAN infrastructure in order to provide means for authenticating and authorizing client devices attached to a LAN port through point-to-point connections and means for preventing access to the LAN if the authentication and authorization process fails. (A LAN port, or network access port, in this context may refer to a physical port through which an edge device, such as a switch, provides access to a network for a client device, or to a logical port, such as an association between an end station and an access point in a wireless network.)

Even in LAN environments that provide for client device authentication, however, currently there are no mechanisms that allow for the resolution, in real-time, of network addresses associated with network traffic streams to the identity of the users and/or the client devices that originate these traffic streams and to the network topological locations through which such streams enter the network. As a result, client device communications transmitted to a network are effectively anonymous and untraceable in real-time, and network sessions through which authenticated client devices access network resources cannot be monitored to provide real-time network diagnostics such as, for example, network attack detection and network attack triangulation.

One past approach for a partial solution to the above problems is to provide a Dynamic Host Configuration Protocol (DHCP) server with a mechanism for keeping track of which IP addresses are assigned to which authenticated client devices. This approach, however, has numerous disadvantages when it comes to providing information that can be used for effective real-time network diagnostics. For example, a DHCP server enabled to implement this approach cannot provide any information regarding the network topological location of the edge device through which a particular client device is attached to the network even though the DHCP server may be able to determine the IP address of the device. In addition, a DHCP server in a multi-segment LAN typically can provide network address information only for client devices and servers in its own segment, and is oblivious to network addresses that are assigned by DHCP servers in other network segments.

Based on the foregoing, there is a clear need for techniques for creating and tracking network sessions that overcome the disadvantages of the past approach described above and that provide for real-time network diagnostics.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system for creating and tracking network sessions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Creating and Tracking Network Sessions
   3.1 Collecting Authenticated Identity Information
   3.2 Collecting Network Address Information
   3.3 Collecting Network Location Information
   3.4 Creating a Session Record
   3.5 Deleting a Session Record
   3.6 Using Session Records for Real-Time Network Diagnostics
4.0 Implementation Mechanisms - Hardware Overview
5.0 Extensions and Alternatives

1.0 General Overview

The needs identified in the foregoing Background, and other needs and objects that will become apparent for the following description, are achieved in the present invention, which comprises, in one aspect, a method for creating and tracking network sessions. A request to access a network is received from an entity. The entity is authenticated after the request is received. Authenticated identity information associated with the entity, network address information associated with the entity, and network location information associated with the entity is collected. An information set is created. The information set comprises and binds together the authenticated identity information, the network address information, and the network location information. The information set indicates a present association among the authenticated identity information, the network address information, and the network location information. The information set is stored in a session record in a centralized database. The session record represents a session in which the entity accesses the network. The session record is one of a plurality of session records that are stored in the centralized database. The plurality of session records is used by a data processing system to perform real-time diagnostics of the network.

In one feature of the aspect, it is detected that the session in which the entity accesses the network has ended. In response to detecting that the session has ended, the session record is removed from the centralized database. In this feature it may be detected that the session in which the entity accesses the network has ended by detecting that the entity has sent a RADIUS Accounting-Request packet, wherein the RADIUS Accounting-Request packet includes an attribute which indicates that the session is being closed.

In a feature of this aspect, based on the session record, the data processing system determines at least one of: whether a particular entity is the entity that originated the session by comparing a particular identity of the particular entity to the authenticated identity information included in the information set that is stored in the session record, whether the session originated from a particular network address by comparing the particular address to the network address information included in the information set that is stored in the session record, and whether the session originated from a particular network location by comparing the particular network location to the network location information included in the information set that is stored in the session record.

In one feature of the aspect, the data processing system is an Intrusion Detection System (IDS). In this feature, the real-time diagnostics of the network includes at least one of network attack detection, network attack diagnostics, and network attack triangulation.

In a feature of this aspect, an edge device that is established in the network performs the steps of the foregoing method. The edge device is any one of a bridge, a switch, and a router. The edge device is configured to operate over at least one protocol that conforms to the IEEE 802.1X standard. The entity is any one of a network end station, a bridge, a switch, and a router. In this feature, the plurality of session records are stored in the centralized database by at least two edge devices.

In one feature of the aspect, the entity is authenticated at an authentication, authorization, and accounting (AAA) server over a Remote Authentication Dial-In Service (RADIUS) protocol. In this feature, the collected authenticated identity information is received from the AAA server.

In a feature of this aspect, the network address information associated with the entity comprises an Internet Protocol (IP) address. In the feature the network address information may be collected by receiving the IP address from the entity or by determining the IP address by snooping messages exchanged between the entity and a Dynamic Host Configuration Protocol (DHCP) server.

In one feature of the aspect, the authenticated identity information comprises any one of an entity identifier that indicates that entity is authenticated and a RADIUS session identifier. In this feature, the network address information comprises any one of an IP address assigned to the entity and a Media Access Control (MAC) address of the entity. Also, in this feature, the network location information comprises any one of an IP address assigned to the edge device through which the entity accesses the network and a port identifier associated with the edge device.

In other aspects, the invention encompasses a system, a computer apparatus, and a computer-readable medium configured to carry out the foregoing steps.

2.0 Structural and Functional Overview

Figure 1:
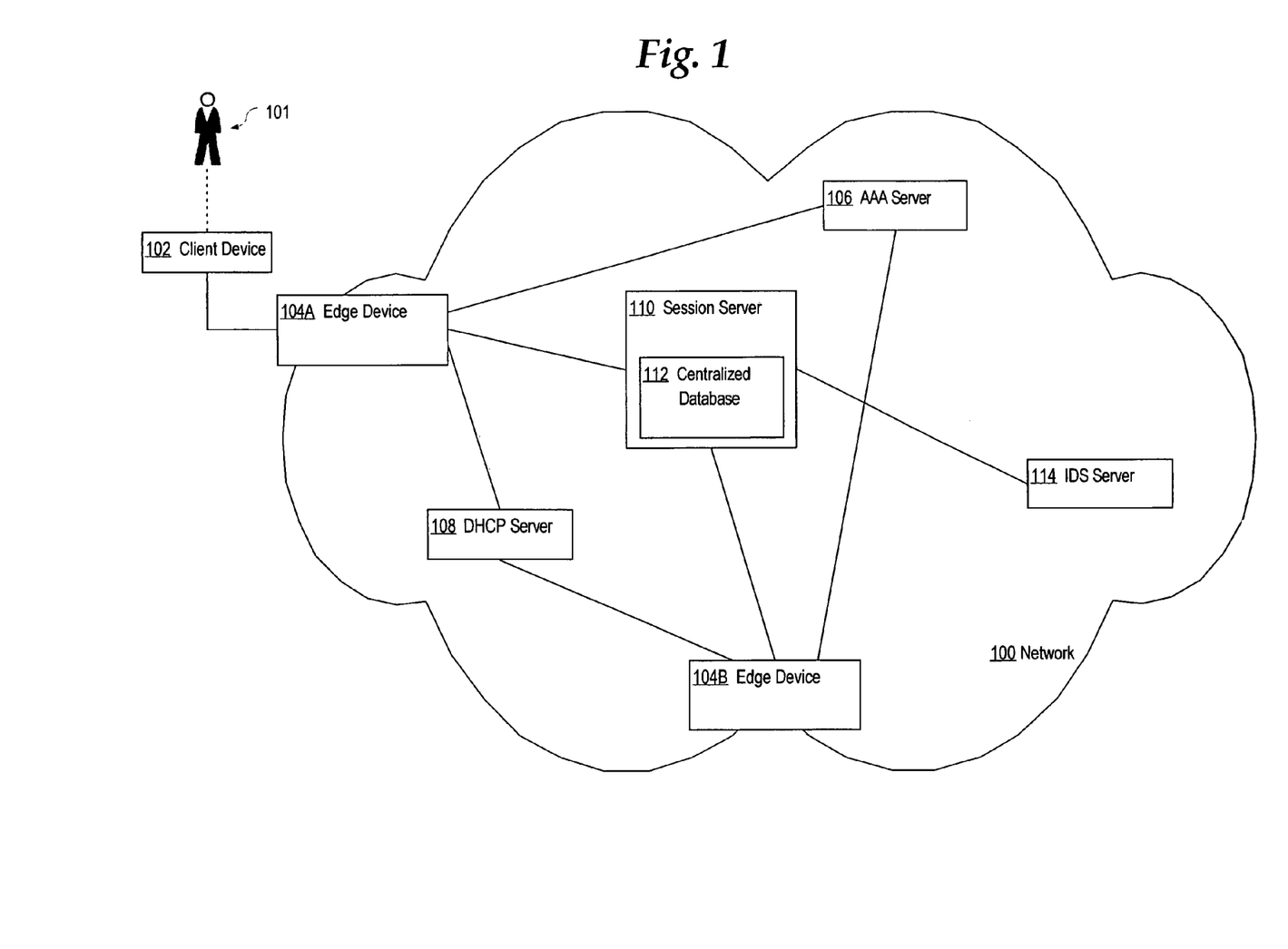
FIG. 1 is a block diagram that illustrates an overview of a system in which an embodiment may be implemented.

FIG. 1 is a block diagram that illustrates an overview of a system in which one embodiment may be implemented.

In FIG. 1, one or more edge devices, such as edge devices 104A and 104B, provide access to network 100. In this embodiment, network 100 is a LAN. In other embodiments, network 100 may be any type of network including, but not limited to, a Metropolitan Area Network (MAN) and a wireless telecommunications network. The edge devices in network 100, such as edge devices 104A and 104B, are communicatively connected to AAA server 106, DHCP server 106, and session server 110. Session server 110 is communicatively connected to one or more data processing systems that are established in network 100,such as for example IDS server 114.

The edge devices, such as edge device 104A, provide outside entities with access to network 100 and to the network services provided therein. Edge device 104A is an 802.1X-enabled device that functions as an access point to network 100. In different embodiments, edge device 104A can be any device, such as a Media Access Control (MAC) bridge, a switch, and router, which is able to provide access to a network over one or more protocols that conform to the IEEE 802.1X standard. For example, edge device 104A may provide access ports for outside entities to connect to network 100. Depending on the particular networking environment, in different embodiments an access port provided by an edge device may be a physical port with its own MAC address that is attached to a physical LAN segment, or a logical port such as an IEEE 802.11 association between an end station and an access point to a wireless network. The entities, which access the network through the access ports provided by edge devices, may be client devices that provide access to the network for one or more users or groups of users. In some embodiments, the client devices may provide access to a particular network for network elements or devices in other networks and not necessarily to individual users. Thus, the client devices that gain access to a network according to the techniques described herein may be devices of any type including, but not limited to, bridges, switches, routers, network end stations, wireless telephones, personal digital assistants (PDAs), hand-held computers, IP phones, standalone WLAN access points, and any other now known or later developed telecommunication devices.

AAA server 106 provides authentication services for users and client devices that want to access network 100 through the edge devices established in the network, such as edge devices 104A and 104B. In the embodiment depicted in FIG. 1, AAA server 106 is an authentication, authorization, and accounting server and provides more functionalities than just authentication. In other embodiments, however, a server dedicated to providing only authentication may be used to authenticate users and devices attempting to access the network.

DHCP server 108 assigns network addresses to devices that connect to network 100. In some embodiments, DHCP server 108 may be providing dynamic IP addresses upon request from client devices that connect to the network. In some embodiments, DHCP server 108 may also be configured for providing static IP addresses to certain entities in the network, such as, for example servers and other infrastructure network elements.

According to the techniques described herein, session server 110 is a server process executed by one or more processors that manages real-time network session information. Session server 110 maintains centralized database 112 and is communicatively connected to all edge devices established in network 100. Centralized database 112 stores session records that represent sessions in which client devices and/or users access network 100 through the edge devices established in the network. When a particular client device connects to the network through a particular edge device, that edge device sends to the session server an information set associated with the particular client device. The information set is stored as a session record in centralized database 112 for the duration of time in which the particular client device is accessing the network. When an edge device detects a session teardown, that edge device notifies session server 110 accordingly and the session server removes the session record representing that session from centralized database 112. In some embodiments, session server 110 may be executing on a dedicated hardware platform; in other embodiments, session server 110 may be executing on the same hardware platform as other components of the system, such as for example DHCP server 108.

The real-time session information maintained by session server 110 is used by data processing systems for real-time network diagnostics. For example, in one embodiment the real-time session information may be queried periodically by IDS server 114 for the purpose of detecting and preventing network attacks. In other embodiments, the data processing system may be any attack sensing and/or notification processing system including, but not limited to, an Event Correlation engine and a Behavioral Anomaly Detection and Analysis engine. In addition, in different embodiments the real-time network session information maintained by session server 110 may be used by a wide variety of data processing systems for a wide variety of purposes including, but not limited to, on-line forensic accounting, off-line accounting, billing, marketing, advertising, data mining, wiretapping, and eavesdropping.

In an operational example described with respect to the components depicted in FIG. 1, suppose that user 101 attempts to connect to network 100 by using client device 102. Client device 102 sends a request for authentication to edge device 104A over an IEEE 802.1X-based protocol. The request may be in the form of a message that includes an 802.1X header and an Extensible Authentication Protocol (EAP) payload, which includes an EAP Response/Identity packet. Edge device 104A unpacks the request, extracts the EAP payload, and re-packages the EAP payload into a RADIUS packet. Edge device 104A then sends the RADIUS packet to AAA server 106.

Upon receiving the RADIUS packet, AAA server 106 unpacks the packet and extracts the EAP payload. AAA server 106 then responds to the request from client device 102 by sending to edge device 104A a RADIUS packet that includes an EAP payload with a challenge to the client device to provide credentials. Edge device 104A receives the RADIUS packet, re-packages the EAP payload included therein into an 802.1X message, and sends the message to client device 102.

In response to the challenge from AAA server 106, client device 102 provides the requested credentials in an 802.1X message to the edge device 104A. Depending on the particular EAP authentication mechanism supported by the AAA server, the credentials may be in the form of a Public Key Infrastructure (PKI) digital certificate, MD5 hashed user/password, or a one-time password. Edge device 104A re-packages the credentials into a RADIUS packet and sends the packet to AAA server 106. AAA server 106 then uses the corresponding authentication algorithm to verify the client device identity based on the provided credentials. If client device 102 has not provided the proper credentials, then AAA server 106 sends a RADIUS packet to edge device 104A indicating that authentication has failed, and edge device 104A denies the client device access to network 100.

If authentication at AAA server 106 succeeds, then AAA server 106 responds by sending to edge device 104A a RADIUS packet that includes an EAP payload with an 802.1X authenticated identifier (ID) for client device 102. In some embodiments, the RADIUS packet may also include a RADIUS session ID that is associated with the RADIUS session which edge device 104A has established with AAA server 106 on behalf of client device 102. Upon receiving the RADIUS packet, edge device 104A sends the EAP payload to client device 102 in an 802.1X message. Client device 102 then opens a port for client device 102 to access network 100. In addition, according to the techniques described herein, edge device 104A stores the authenticated ID for client device 102 that was received from AAA server 106.

Once authenticated and granted access to network 100, client device 102 sends a request for an IP address to DHCP server 108 through the port opened on edge device 104A. DHCP server 108 responds with a message assigning a specific IP address to the client device. Before re-sending the message to client device 102, edge device 104A extracts from the message any network address information that DHCP server 108 has associated with client device 102. For example, the network address information may include the MAC address of client device 102, the assigned IP address, the lease time, and any other relevant interface information for the client device.

According to the techniques described herein, edge device 104A then correlates the authenticated identity information of client device 102 received from AAA server 106 with the network address information received from DHCP server 108. Edge device 104A binds together, in an information set, the authenticated identify information of client device 102, the network address information of client device 102, and network topological location information for the client device 102. (The network location information of client device 102 may include the IP address of edge device 104A and the port ID of the port through which client device 102 accesses network 100; edge device 104A typically stores this information in one or more internal tables.)

Edge device 104A then creates a session record in centralized database 112, which session record represents the session in which client device 102 accesses network 100. Specifically, edge device 104A sends the information set (which includes the authenticated identity information, the network address information, and the network location information of client device 102) to session server 110 in a RADIUS Accounting packet. In response to receiving the RADIUS Accounting packet, session server 110 extracts the information set and creates a corresponding session record in centralized database 112. Being stored as a session record, the information set indicates that a present association exists among the authenticated identity information, the network address information, and the network location information of client device 102 for the duration of the session in which client device 102 is connected to network 100.

When edge device 104A detects that the session through which client device 102 accesses network 100 has ended, edge device 104A sends a RADIUS accounting packet to session server 110 in order to remove the corresponding session record from centralized database 112. By removing the session record from the centralized database, the temporal binding between the authenticated identity information, the network address information, and the network location information of client device 102 is ended, and the centralized database 112 no longer indicates that the authenticated identity information, the network address information, and the network location information of client device 102 are associated with each other.

In this way, session server 110 maintains in centralized database 112 a plurality of session records that represent a plurality of sessions in which client devices presently access network 100. The client devices accessing network 100 may be connected through edge device 104A or through any other edge devices such as edge device 104B. The session records stored in centralized database 112 are utilized by a variety of data processing systems for real-time network diagnostics. For example, in the embodiment depicted in FIG. 1, IDS 114 may periodically query the plurality of session records in centralized database 112 as part of performing on-going network attack detection, network attack diagnostics, and network attack triangulation.

3.0 Method of Creating and Tracking Network Sessions

Figure 3:
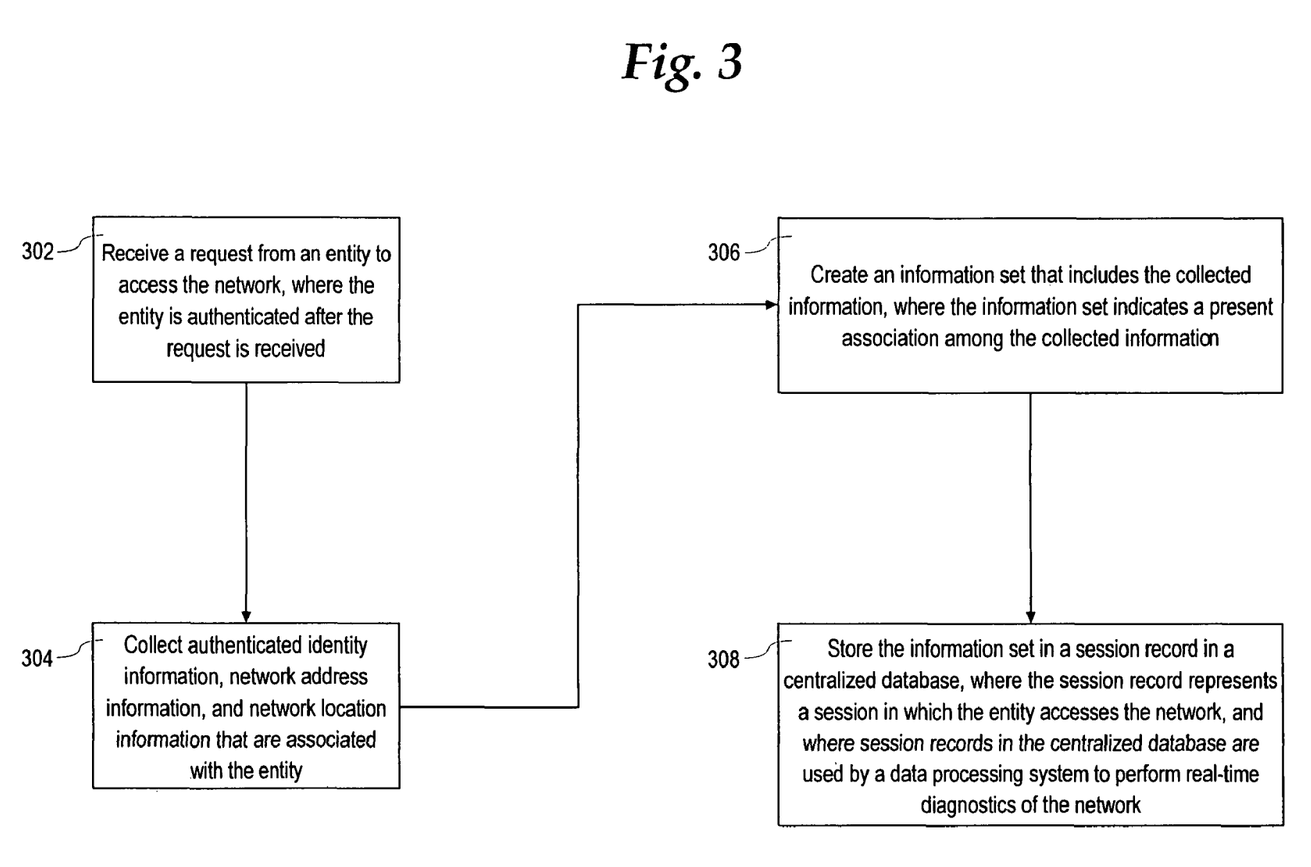
FIG. 3 is a flow diagram that illustrates a high level overview of one embodiment of a method for creating and tracking network sessions.

FIG. 3 is a flow diagram that illustrates a high level overview of one embodiment of a method for creating and tracking network sessions in a network.

In step 302, a request to access the network is received from an entity. The request may be received at an edge device that is configured to provide access to the network to one or more outside entities such as, for example, client devices receiving input from users and switches or routers in other networks. After receiving the request, the edge device sends a message to an authentication server to authenticate the entity that sent the request. After the authentication server authenticates the entity and informs the edge device accordingly, the edge device grants the entity access to the network.

In step 304, the edge device collects authenticated identify information, network address information, and network location information that are associated with the entity. In some operational contexts, the authenticated identity information may comprise an authenticated ID that is received from the authentication server, the network address information may comprise a MAC address associated with the entity and an IP address assigned to the entity by a DHCP server established in the network, and the network location information may comprise the IP address of the edge device and the port ID of the port on the edge device through which the entity accesses the network.

In step 306, an information set is created. The information set comprises and binds together the collected authenticated identify information, network address information, and network location information that are associated with the entity. In some operational contexts, the authenticated identify information, network address information, and network location information associated with the entity are correlated and matched at the edge device. In other operational contexts, an edge device may send all the information in the information set to a session server that maintains real-time session information, and the session server may then perform any correlation or matching that may be necessary before creating and storing a session record representing the session through which the entity accesses the network.

In step 308 the information set is stored in a session record in a centralized database managed by the session server. The session record represents the session in which the entity accesses the network. The session record is maintained in the centralized database for the duration of the session, and is removed from the database when it is detected that the session has ended. In the same manner, the session server maintains in the centralized database session records for any sessions established to the network through any edge device by any entity. The session records stored in the centralized database thus represent real-time session information that indicates all active sessions established by entities to the network at any given time. The session records stored in the centralized database are used by one or more data processing systems to perform real-time diagnostics of the network.

Thus, the techniques described herein provide for tracking network sessions in real-time and for performing real-time diagnostics in a network. Based on the real-time diagnostics and/or on the session information for active sessions stored in a centralized database, a network engineer or an automated dynamic response system can make decisions whether to dynamically reconfigure or terminate specific existing sessions in order to minimize overall network impact or to otherwise improve network performance. In addition, in different operational contexts, the session information stored in the centralized database may be used by a wide variety of data processing systems for performing a wide variety of real-time and/or off-line diagnostics and analysis.

3.1 Collecting Authenticated Identity Information

In one operational context, an edge device provides entities with access to a network through logical or physical ports on the device. An entity that wants to access the network communicates with the edge device over a protocol conforming to the IEEE 802.1X standard. The edge device communicates with an authentication server over a RADIUS protocol or over other protocols that provide similar functionality, for example TACACS. Thus, the edge device functions as middleman between entities that need to access the network and an authentication server or servers that need to authenticate the entities. For example, in some embodiments an entity that needs to gain access to the network communicates with an authentication server over an EAP protocol. In these embodiments, an edge device to which the entity is connected repackages any authentication-related EAP requests received from the entity in 802.1X messages into RADIUS packets that the device sends to the authentication server; similarly, the edge device repackages any EAP responses received from the authentication server in RADIUS packets into 802.1X messages that are sent to the entity.

According to the techniques for creating and managing network sessions described herein, an edge device collects and stores authentication information received from an authentication server which indicates that the identity of a particular entity has been successfully authenticated. In some embodiments, such authenticated identity information comprises an EAP authenticated ID for the entity. Since the edge device processes and repackages all communications exchanged between the entity and the authentication server, the edge device is capable of extracting from such communications any authenticated ID or other authentication information associated with the entity.

In some embodiments, in addition to the authenticated ID, the edge device may extract from the communications exchanged between an entity seeking authentication and an authentication server any other information that may be associated with the identity of the entity. For example, if the entity is client device used by a user, the edge device may collect any user-related information such as, for example, a username or a user ID. In another example, if the edge device communicates on behalf of the entity with the authentication server over a RADIUS session, the edge device may collect and store the specific identifier that is associated with that RADIUS session. In another example, the edge device may extract from the communications exchanged between the entity and the authentication server the MAC address of the entity. In another example, the edge device may store the port ID of the access port on the device through which the entity is connected to the network. Thus, depending on the particular operational context, the authenticated identity information collected by an edge device according to the described techniques may include a variety of parameters and data items and is not limited to the particular examples provided herein. Further, in some embodiments additional information associated with the entity may be collected for the purpose of matching and correlating any collected authenticated identity information with other types of information associated with the entity, such as, for example, network address information.

3.2 Collecting Network Address Information

In the operational contexts described herein, an entity is connected to a network through an access port on an edge device. Thus, the edge device processes and/or retransmits all communications that are sent from the entity to the network and from the network to the entity. According to the techniques described herein, the edge device is configured to extract and collect from such communications network address information associated with the entity.

In some embodiments, the network address information associated with an entity that is collected by an edge device may comprise the network address of the entity. Further, the network address information associated with the entity may also comprise the MAC address of the entity. For example, in a packet-switched network the network address information associated with an entity may comprise an IP address and a MAC address. In other embodiments, the network address information associated with an entity may comprise the address of a subnet. For example, the entity may be a user that has several network-enabled devices associated with him or her, such as a wired Personal Computer (PC), a wireless laptop, an IP phone, a PDA, and a printer. All the network-enabled devices associated with a particular user may be assigned IP addresses from a subnet that is reserved for that particular user, and the address of the subnet may be collected at an edge device instead of the IP address assigned to each network-enabled device of the user. Thus, the network address information of an entity collected according to the described techniques is not limited to any particular number or type of data, and the examples of network address information provided herein are to be regarded in an illustrative rather than a restrictive sense.

In some embodiments, as part of collecting network address information an edge device may also collect additional information associated with an entity for the purpose of matching the network address information to other types of information associated with the entity. For example, in some embodiments, in addition to collecting the IP address assigned to the entity, an edge device may also collect and store the port ID of the port on the edge device through which the entity is connected to the network, and the RADIUS session IDs of any RADIUS sessions which the edge device has opened while servicing requests received from the entity.

In some embodiments, an entity connecting to a network through an edge device port is assigned, or has, a static IP address. In these embodiments, the edge device may be configured to collect or extract the entity's IP address from communications received from, or re-transmitted on behalf of the entity. For example, in one embodiment an entity that is assigned a static IP address may be configured to communicate with the edge device over a RADIUS protocol. In this embodiment, the entity may be configured to announce its IP address to the edge device by including the IP address in a Framed-IP-Address attribute-value pair of a RADIUS Access-Accept packet.

In some embodiments, an entity connecting to a network through an edge device port may request to be assigned a dynamic IP address. For example, after being authenticated, the entity may send a request for an IP address to a DHCP server. In these embodiments, the edge device through which the entity is connected to the network may be configured to extract the network address assigned to the entity from the response returned to the entity by the DHCP server.

For example, in one embodiment the edge device may be configured to perform DHCP snooping. An example of an edge device that may be configured for DHCP snooping is the Cisco Systems' Catalyst 4500 Series switch. DHCP snooping is a feature that provides for filtering untrusted DHCP messages and maintaining a DHCP snooping binding table. A DHCP snooping binding table maintained at an edge device may contain the MAC address, IP address, DHCP lease time, binding type, and VLAN number for entities that are connected to the network through network interfaces on the edge device. An edge device configured for DHCP snooping would typically extract from DHCP messages exchanged between entities and a DHCP server any information that is necessary to maintain the DHCP snooping table. In this embodiment, in order to collect the network address information associated with a particular entity, an edge device needs to locate and extract the necessary information from its DHCP snooping table. In this way, the techniques described herein make use of the DHCP snooping features configured on an edge device to provide for collecting network address information that is associated with entities connected to the network through the device.

3.3 Collecting Network Location Information

According to the techniques described herein, an edge device providing an outside entity with access to a network also collects network location information associated with the entity. The collected network location information indicates the topological location in the network at which the entity and the edge device are connected.

For example, in one embodiment the network location information may comprise the IP address of the edge device and the port ID of the port on the device through which the entity is connected to the network. The edge device maintains the port-entity bindings in internal tables or databases. For example, in some embodiments a binding between a port ID and the MAC address of the associated entity may be stored in an Management Information Base (MIB) maintained by a MIB agent on the edge device. In other embodiments, the bindings between port IDs and entities connected to the edge device's ports may be stored in an LDAP directory or other similar data structure.

According to the techniques described herein, an edge device is capable of correlating network location information with other types of information collected for a particular entity based on the port-entity binding information that the device stores. For example, an edge device may be able to correlate authenticated identity information and network address information of a particular entity based on the port ID of the edge device port through which the particular entity is connected to the network.

3.4 Creating a Session Record

The techniques described herein for creating and tracking network sessions provide for creating and storing an information set that comprises and binds together the authenticated identity information, network address information, and network location information that are collected for an entity that is connected to the network through a port on an edge device. The information set indicates a present association among the authenticated identity information, network address information, and network location information associated with the entity. As used herein, "present association" refers to a temporal binding that exists among the information collected for a particular entity for the duration of time for which the information set is stored. A present association indicates that a particular authenticated entity is associated with a particular address information and is connected to the network at a particular topological location.

In some embodiments, an edge device correlates into an information set the authenticated identity information, network address information, and network location information that are associated with an entity connected to the network through the edge device. In these embodiments, the edge device may use the values stored in common fields in the collected authenticated identity information, network address information, and network location information in order to match each of the collected information to the correct entity. For example, an edge device may use the entity's MAC address and the port ID of the port through which the entity is connected to the edge device in order to correlate all collected information. After the information set is created in this manner, the edge device may send the information set to a session server, such as session server 110 depicted in FIG. 1, over a RADIUS Accounting protocol.

In other embodiments, an edge device may report all collected information to the session server. In these embodiments, the edge device may establish a RADIUS Accounting session to the session server, and may report the collected authenticated identity information, network address information, and network location information associated with an entity by using attribute-value pairs in RADIUS Accounting packets. Upon receiving from an edge device the information collected for a particular entity, the session server correlates the information into an information set based on common and/or unique fields in the collected information.

After an information set comprising authenticated identity information, network address information, and network location information associated with an entity is created by either an edge device or a session server, the information set is stored as a session record in a centralized database. If the information set is created at an edge device, the edge device may create the session record that stores the information set by utilizing an Open DataBase Connectivity (ODBC) or other data-management API that is provided for interfacing with the centralized database. A session represented by a session record indicates a duration of time during which an entity is connected to the network and accesses one or more network services provided therein.

Figure 2:
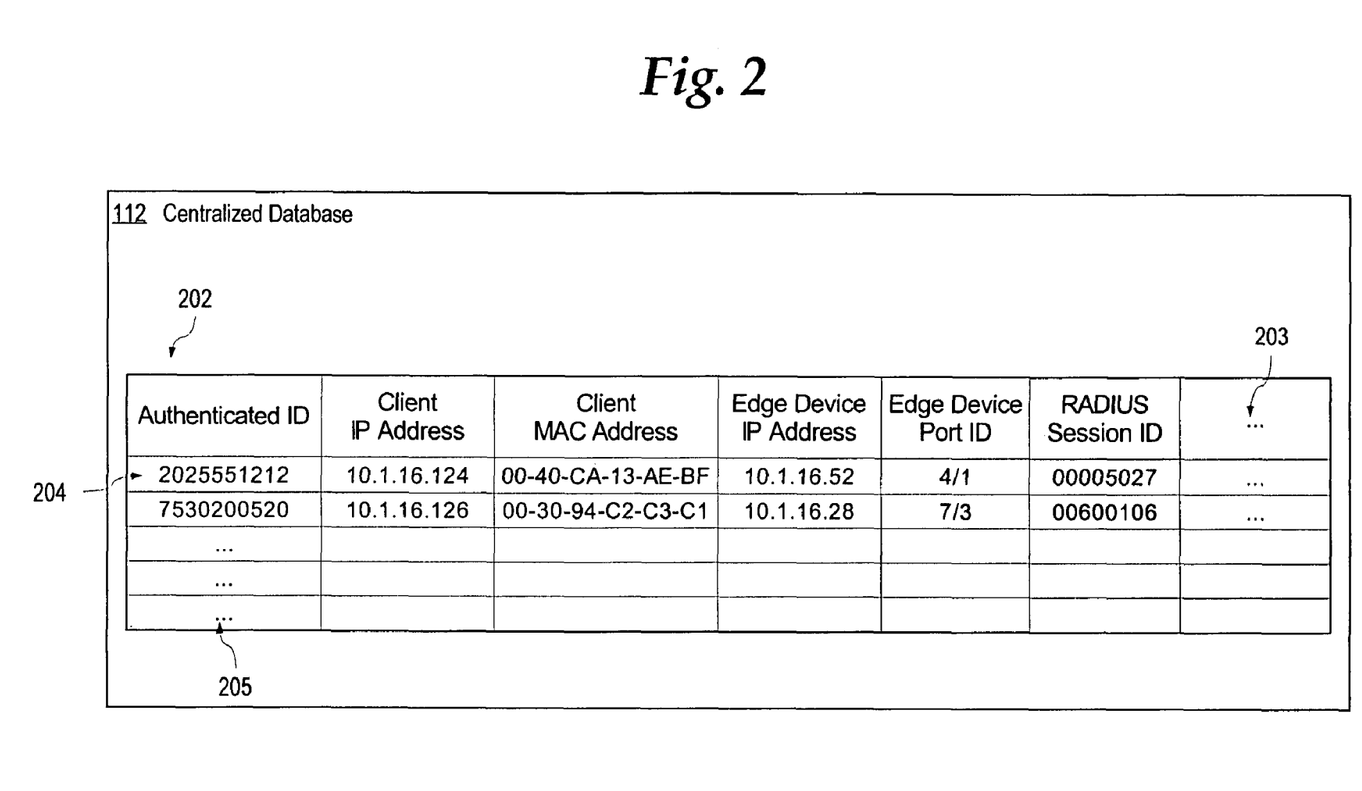
FIG. 2 is a block diagram that illustrates a portion of a centralized database in which a session record represents a session and binds together authenticated identity information, network address information, and network location information according to one embodiment.

In one embodiment, a centralized database is managed by a session server and stores session records representing sessions in which entities are connected to and access the network through the edge devices established in the network. FIG. 2 is a block diagram that illustrates a portion of a centralized database, in which a session record represents a session and stores an information set that binds together authenticated identity information, network address information, and network location information associated with an entity.

In FIG. 2, centralized database 112 comprises session table 202. Session table 202 comprises a plurality of session records, such as session record 204. Ellipsis 205 indicates that session table 202 may store an arbitrary number of session records. Each session record stored in session table 202 comprises one or more columns for storing authenticated identity information, network address information, and network location information that are associated with an entity which is currently accessing the network. For example, as depicted in FIG. 2, a session record may store: authenticated identity information in columns "Authenticated ID" and "RADIUS Session ID", which may store 802.1X authenticated ID and Radius Session ID values, respectively; network address information in columns "Client IP Address" and "Client MAC Address", which may store IP address and MAC address values, respectively; and network location information in columns "Edge Device IP Address" and "Edge Device Port ID", which may store IP address and port ID values, respectively. Ellipsis 203 indicates that each session record may also include one or more other columns for storing additional authenticated identity information, network address information, and/or network location data items.

In different embodiments, the centralized database of session records may be structured as any now known or later developed data repository including, but not limited to, a relational database, an object-oriented database, a hierarchical database, a MIB, an LDAP directory, and one or more files or hierarchy of files in a file system. In addition, in different embodiments the centralized database may be kept in volatile storage, such as memory, for faster access; alternatively, or in addition to, the centralized database may be stored on any now known or later-developed non-volatile or permanent storage. Thus, the centralized database depicted in FIG. 1 and FIG. 2 is to be regarded in an illustrative rather than a restrictive sense.

3.5 Deleting a Session Record

In some embodiments, the techniques described herein provide for removing from the centralized database any session records that represent sessions that have ended. In these embodiments, an edge device through which an entity is connected to a network may be configured to detect session teardowns. In response to detecting that a session in which an entity accesses the network has ended, the edge device may remove from the centralized database the session record that represents that session.

In different embodiments, an edge device may use a variety of means to detect that a session in which an entity accesses the network has ended. For example, in some embodiments an edge device may detect that an entity connected to a particular port on the device is not responding or is disconnected. In other embodiments, the edge device may detect that the entity has logged off from the network. In yet other embodiments, the edge device may have established a RADIUS session to the entity. In these embodiments, the edge device may detect that the entity's session to the network has ended when the edge device receives from the entity a RADIUS Accounting-Request packet that includes an attribute that indicates that the session is being closed.

In response to detecting a session teardown, an edge device may remove the corresponding session record from the centralized database by using a variety of means. For example, if the centralized database provides an ODBC API, the edge device may send a request to remove the session record to the centralized database by invoking one or more functions in the API. In embodiments where access to the centralized database is managed by a session server, the edge device may send a request with information identifying the session record to the session server, and the session server may locate and remove the session record from the centralized database. Further, depending on the particular operational context, in some embodiments any session records that are deleted from the centralized database may optionally be logged or archived in order to provide for off-line analysis.

3.6 Using Session Records for Real-Time Network Diagnostics

According to the techniques described herein, a data processing system uses the session records, which are stored in a centralized database to represent current sessions in which entities access a network, for performing real-time diagnostics of the network. In different embodiments, the data processing system may be any attack sensing and/or notification processing system including, but not limited to, an Intrusion Detection System (IDS), an Event Correlation engine, and a Behavioral Anomaly Detection and Analysis engine.

In one embodiment, the data processing system is an IDS. An IDS is typically used for detecting inappropriate, incorrect, or anomalous activity in a network or in one or more network segments by monitoring network traffic flows that pass through the network or through the one or more network segments. The IDS uses as a data source network packets that are captured at one or more network interfaces of the IDS. The one or more network interfaces are typically configured in a promiscuous mode to capture all network packets that cross the network or the particular one or more network segments that the IDS is monitoring. As network packets pass through the one or more network interfaces of the IDS, the IDS may use filters, software sensors, or other look-up tools to inspect and/or extract the contents of the packets that pass through the system. In conjunction with pre-configured rules or policies, the IDS may use the information gleaned from the network packets to perform diagnostics of the various activities taking place in the network.

In this embodiment, the techniques for creating and tracking network sessions described herein allow an IDS to use session records stored in a centralized database to perform diagnostics of the network in real-time. Such real-time diagnostic of the network may include, but is not limited to, network attack detection, network attack diagnostics, and network attack triangulation. Since the session records in the centralized database store authenticated identity information, network address information, and network location information for entities that are currently accessing the network, the IDS may use the information stored in the session records to pinpoint in real-time the point of origin for a particular network session, the identity of the entity that originated the particular session, and the topological location in the network at which the network traffic of the particular session enters the network. The strong binding between the authenticated identity information, network address information, and network location information that is indicated by the presence of a session record allows for rapid real-time identification of originators and origin of particular traffic flows. Such rapid real-time identification capabilities greatly reduce the mean time for resolving network-driven incidents and allow a dynamic response mechanism (in an IDS or in another monitoring system) to accurately reconfigure the authorization and access permissions for network clients.

For example, the IDS may extract from captured network packet identity information of a particular entity that originated the packets. The IDS may then compare the extracted identity information to the authenticated identity information stored in the session records of the centralized database in order to determine whether the particular entity is indeed the entity that originated the captured network packets. In another example, the IDS may extract network address information, such as for example IP addresses, from captured network packets. The IDS may then compare the extracted address information to the network address information stored in the session records of the centralized database in order to determine whether the captured network packets indeed originated from a particular entity or network session. In another example, the IDS may extract network location information from network packets that it captures. The IDS may then compare the extracted location information to the network location information stored in the session records of the centralized database in order to determine whether the captured network packets entered the network from a particular topological location.

In other embodiments, the session records stored in the centralized database according to the techniques described herein may be used by other types of data processing systems to perform other types of network diagnostics. Such other types of data processing systems include, but are not limited to, forensic accounting systems, off-line accounting systems, billing systems, marketing systems, on-line advertising systems, data mining systems, wiretapping systems, and eavesdropping systems. Thus, the session records stored in a centralized database according to the techniques described herein may be accessed and/or queried by a wide variety of data processing systems for a wide variety of purposes that may require accurate real-time identification of entities connected to a network, and for this reason the examples of data processing systems provided herein are to be regarded in an illustrative rather than a restrictive sense.

4.0 Implementation Mechanisms—Hardware Overview

Figure 4:
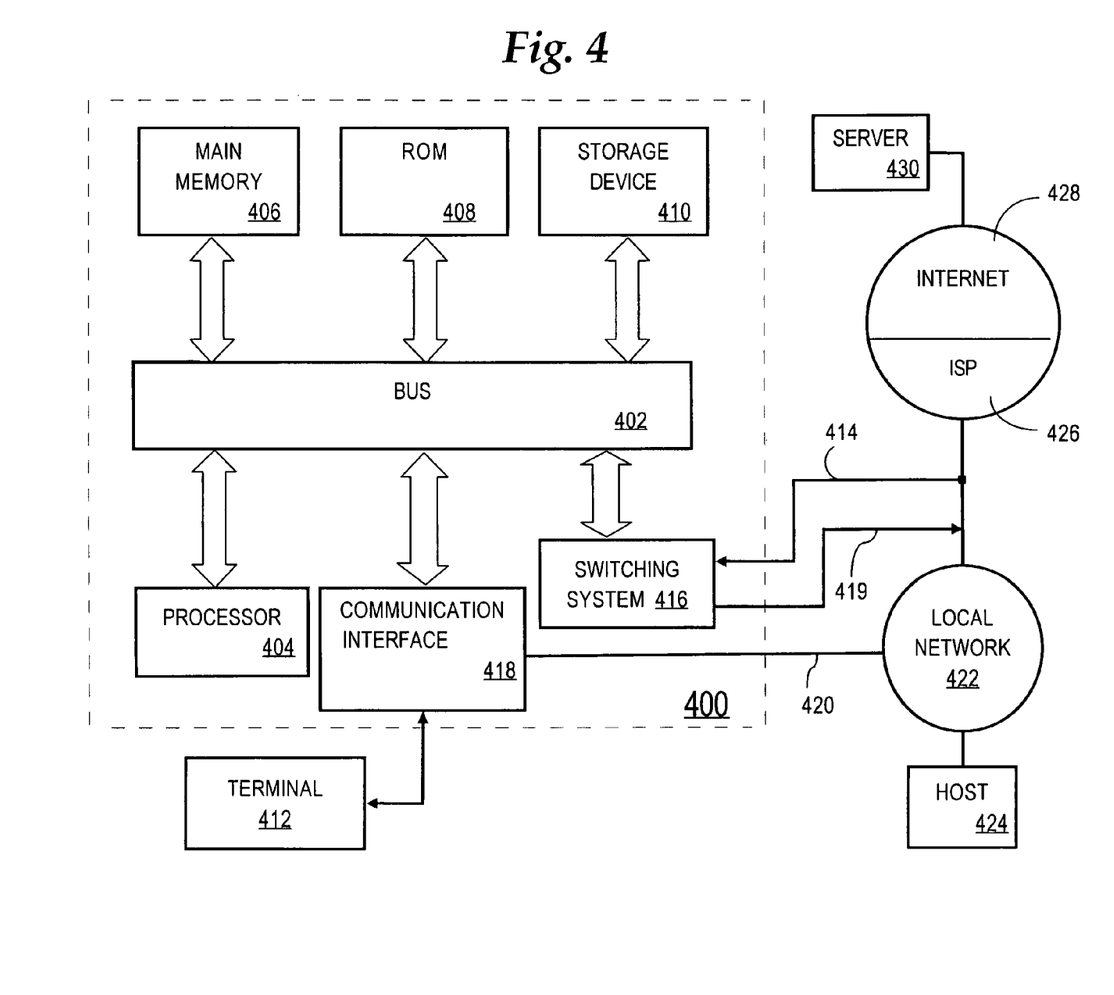
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as, for example, a bridge device, a switch device, or a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for creating and tracking network sessions. According to one embodiment of the invention, creating and tracking of network sessions is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for creating and tracking network sessions as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for creating and tracking network sessions, the method comprising the computer-implemented steps of:
   receiving a request from an entity to access a network, wherein the entity is authenticated after the request is received;
   collecting authenticated identity information associated with the entity, network address information associated with the entity, and network location information associated with the entity;
   creating an information set that comprises and binds together the authenticated identity information, the network address information, and the network location information, wherein the information set indicates a present association among the authenticated identity information, the network address information, and the network location information; and storing the information set in a session record in a centralized database, wherein the session record represents a session in which the entity accesses the network, wherein the session record is one of a plurality of session records that are stored in the centralized database, and wherein the plurality of session records are used by a data processing system to perform real-time diagnostics of the network;

wherein the network location information identifies an edge device on the network that received the request from the entity;

wherein the steps of the method are performed by the edge device.

2. A method as recited in claim 1, further comprising:
detecting that the session in which the entity accesses the network has ended; and
in response to detecting that the session has ended, removing the session record from the centralized database.

3. A method as recited in claim 1, wherein based on the session record, the data processing system determines at least one of:
whether a particular entity is the entity that originated the session by comparing a particular identity of the particular entity to the authenticated identity information included in the information set that is stored in the session record;
whether the session originated from a particular network address by comparing the particular address to the network address information included in the information set that is stored in the session record; and
whether the session originated from a particular network location by comparing the particular network location to the network location information included in the information set that is stored in the session record.

4. A method as recited in claim 1, wherein:
the data processing system is an Intrusion Detection System (IDS); and
the real-time diagnostics of the network include at least one of network attack detection, network attack diagnostics, and network attack triangulation.

5. A method as recited in claim 1, wherein:
the edge device is established in the network;
the edge device is any one of a bridge, a switch, and a router;
the edge device is configured to operate over at least one protocol that conforms to the IEEE 802.1X standard; and
the entity is any one of a network end station, a bridge, a switch, and a router.

6. A method as recited in claim 5, wherein the plurality of session records are stored in the centralized database by at least two edge devices, wherein the at least two edge devices include the edge device.

7. A method as recited in claim 1, wherein, based on a source address of a particular message transmitted through the network and the session record, the data processing system determines at least one of:
a particular authenticated identity for a particular entity at the source address; and
a particular network location where the particular message originated.

8. An apparatus for creating and tracking network sessions, comprising:
a network interface that is coupled to a packet-switched network for receiving one or more packet flows therefrom;
one or more processors; and
one or more stored sequences of instructions which, when executed by the one or more processors, cause the one or more processors to perform the steps of:
receiving a request from an entity to access a network, wherein the entity is authenticated after the request is received;
collecting authenticated identity information associated with the entity, network address information associated with the entity, and network location information associated with the entity;
creating an information set that comprises and binds together the authenticated identity information, the network address information, and the network location information, wherein the information set indicates a present association among the authenticated identity information, the network address information, and the network location information; and
storing the information set in a session record in a centralized database, wherein the session record represents a session in which the entity accesses the network, wherein the session record is one of a plurality of session records that are stored in the centralized database, and wherein the plurality of session records are used by a data processing system to perform real-time diagnostics of the network;
wherein the network location information identifies an edge device on the network that received the request from the entity.

9. The apparatus of claim 8, wherein the one or more stored sequences of instructions further comprise instructions which, when executed by the one or more processors, cause the one or more processors to perform the steps of:
detecting that the session in which the entity accesses the network has ended; and
in response to detecting that the session has ended, removing the session record from the centralized database.

10. The apparatus of claim 8, wherein:
the entity is authenticated at an authentication, authorization, and accounting (AAA) server over a Remote Authentication Dial-In Service (RADIUS) protocol; and
collecting the authenticated identity information associated with the entity comprises receiving the authenticated identity information from the AAA server.

11. The apparatus of claim 8, wherein the one or more stored sequences of instructions further comprise instructions which, when executed by the one or more processors, cause the one or more processors to perform the step of detecting that the session in which the entity accesses the network has ended by detecting that the entity has sent a RADIUS Accounting-Request packet, wherein the RADIUS Accounting-Request packet includes an attribute which indicates that the session is being closed.

12. The apparatus of claim 8, wherein:
the network address information associated with the entity comprises an Internet Protocol (IP) address; and
collecting the network address information comprises any one of:
receiving the IP address from the entity; and determining the IP address by snooping messages exchanged between the entity and a Dynamic Host Configuration Protocol (DHCP) server.

13. The apparatus of claim 8, wherein:
the authenticated identity information comprises any one of an entity identifier that indicates that entity is authenticated and a Remote Authentication Dial-In Service (RADIUS) session identifier;
the network address information comprises any one of a first Internet Protocol (IP) address assigned to the entity and a Media Access Control (MAC) address of the entity; and
the network location information comprises any one of a second IP address assigned to the apparatus and a port identifier associated with the apparatus.

14. The apparatus of claim 8, wherein:
the apparatus is any one of a bridge, a switch, and a router that is established in the network and is configured to provide access to the network over at least one protocol that conforms to the IEEE 802.1X standard; and
the entity is any one of a network end station, a bridge, a switch, and a router.

15. The apparatus of claim 8, wherein:
the data processing system is an Intrusion Detection System (IDS); and
based on the session record, the data processing system determines at least one of:
whether a particular entity is the entity that originated the session by comparing a particular identity of the particular entity to the authenticated identity information included in the information set that is stored in the session record;
whether the session originated from a particular network address by comparing the particular address to the network address information included in the information set that is stored in the session record; and
whether the session originated from a particular network location by comparing the particular network location to the network location information included in the information set that is stored in the session record.

16. An apparatus as recited in claim 8, wherein, based on a source address of a particular message transmitted through the network and the session record, the data processing system determines at least one of:
a particular authenticated identity for a particular entity at the source address; and
a particular network location where the particular message originated.

17. A non-transitory computer-readable storage medium storing one or more sequences of instructions for creating and tracking network sessions, which instructions, when executed by one or more processors, cause the one or more processors to perform the steps of:
receiving a request from an entity to access a network, wherein the entity is authenticated after the request is received;
collecting authenticated identity information associated with the entity, network address information associated with the entity, and network location information associated with the entity;
creating an information set that comprises and binds together the authenticated identity information, the network address information, and the network location information, wherein the information set indicates a present association among the authenticated identity information, the network address information, and the network location information; and
storing the information set in a session record in a centralized database, wherein the session record represents a session in which the entity accesses the network, wherein the session record is one of a plurality of session records that are stored in the centralized database, and wherein the plurality of session records are used by a data processing system to perform real-time diagnostics of the network;
wherein the network location information identifies an edge device on the network that received the request from the entity.

18. A non-transitory computer-readable storage medium as recited in claim 17, storing one or more sequences of instructions for creating and tracking network sessions, which instructions, when executed by one or more processors, cause the one or more processors to perform the steps further comprising:
detecting that the session in which the entity accesses the network has ended; and
in response to detecting that the session has ended, removing the session record from the centralized database.

19. A non-transitory computer-readable storage medium as recited in claim 17, wherein based on the session record, the data processing system determines at least one of:
whether a particular entity is the entity that originated the session by comparing a particular identity of the particular entity to the authenticated identity information included in the information set that is stored in the session record;
whether the session originated from a particular network address by comparing the particular address to the network address information included in the information set that is stored in the session record; and
whether the session originated from a particular network location by comparing the particular network location to the network location information included in the information set that is stored in the session record.

20. A non-transitory computer-readable storage medium as recited in claim 17, wherein:
the data processing system is an Intrusion Detection System (IDS); and
the real-time diagnostics of the network include at least one of network attack detection, network attack diagnostics, and network attack triangulation.

21. A non-transitory computer-readable storage medium as recited in claim 17, wherein:
the one or more sequences of instructions are included in an edge device that is established in the network;
the edge device is any one of a bridge, a switch, and a router;
the edge device is configured to operate over at least one protocol that conforms to the IEEE 802.1X standard; and
the entity is any one of a network end station, a bridge, a switch, and a router.

22. A non-transitory computer-readable storage medium as recited in claim 21, wherein the plurality of session records are stored in the centralized database by at least two edge devices, wherein the at least two edge devices include the edge device.

23. A non-transitory computer-readable storage medium as recited in claim 17, wherein, based on a source address of a particular message transmitted through the network and the session record, the data processing system determines at least one of:
a particular authenticated identity for a particular entity at the source address; and
a particular network location where the particular message originated.

* * * * *